United States Patent
Freund et al.

[11] Patent Number: 5,320,760
[45] Date of Patent: Jun. 14, 1994

[54] METHOD OF DETERMINING FILTER PLUGGAGE BY MEASURING PRESSURES

[75] Inventors: Kenneth S. Freund, Hendersonville; Elizabeth L. Frisbie, Old Hickory; Robert E. Wojcik, Hendersonville, all of Tenn.

[73] Assignee: E. I. Du Pont de Nemours and Company, Wilmington, Del.

[21] Appl. No.: 986,450

[22] Filed: Dec. 7, 1992

[51] Int. Cl.⁵ .............................. B01D 35/143
[52] U.S. Cl. ...................... 210/741; 28/104; 28/167; 137/14; 210/90; 340/606; 364/510
[58] Field of Search ........ 28/104, 105, 167; 137/14; 210/90, 97, 143, 741, 340, 341; 340/606, 607, 608; 364/509, 510, 551.01, 558

[56] References Cited
U.S. PATENT DOCUMENTS

| | | | |
|---|---|---|---|
| 3,403,862 | 10/1968 | Dworjanyn | 239/566 |
| 3,485,706 | 12/1969 | Evans | 28/105 |
| 3,485,709 | 12/1969 | Evans et al. | 28/105 |
| 3,875,955 | 4/1975 | Gallatin et al. | 364/510 |
| 4,277,832 | 7/1981 | Wong | 364/510 |
| 4,581,707 | 4/1986 | Millar | 364/510 |
| 4,685,066 | 8/1987 | Hafele et al. | 364/510 |
| 5,060,167 | 10/1991 | Ticcioni et al. | 364/510 |
| 5,069,792 | 2/1991 | Prince et al. | 210/627 |
| 5,080,952 | 1/1992 | Willbanks | 28/167 |
| 5,094,741 | 3/1992 | Frank et al. | 210/198.2 |
| 5,096,574 | 3/1992 | Birdsong et al. | 210/90 |
| 5,110,458 | 5/1992 | Hechler et al. | 210/90 |
| 5,209,822 | 5/1993 | Clarke-Pounder et al. | 210/741 |
| 5,235,733 | 8/1993 | Willibanks et al. | 28/105 |

*Primary Examiner*—Joseph W. Drodge

[57] ABSTRACT

A method to determine differential filter pressure caused by filter pluggage in a high pressure liquid system operated by a computer-operated control valve without the need for a pressure sensor coupled to the filter by corerlating the percent the control valve is open with the differential pressure of the filter. A signal is provided when the percentage of time the control valve is open exceeds a predetermined time and the filter is replaced in response to the signal.

2 Claims, 3 Drawing Sheets

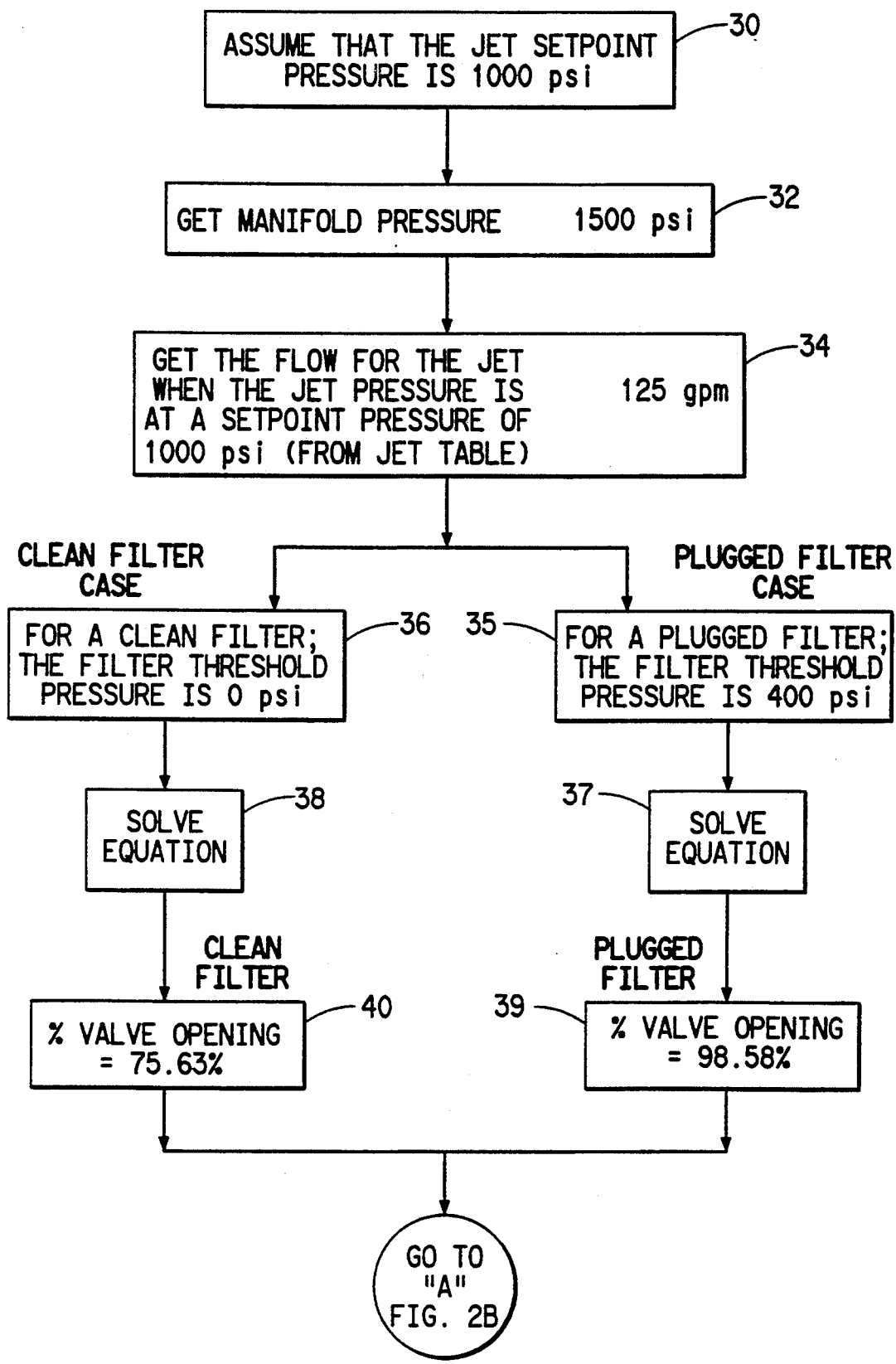

METHOD OF DETERMINING FILTER PLUGGAGE BY MEASURING PRESSURES

BACKGROUND OF THE INVENTION

This invention relates to a method to determine filter pluggage.

It is known to produce nonwoven fabrics by jetting liquid streams into a layer of fibrous material to entangle the fibers. Liquid is jetted at high pressure from a line of orifices in a jet to form high energy streams. The energy of the stream is proportional to the pressure at which the stream is formed and to the volumetric flow rate. To protect the orifices in the jet from particles in the liquid that may plug the orifices, it is known to install a filter in the liquid supply upstream of the orifices. As the filter removes particles from the liquid, the pressure drop across the filter increases. If the pressure drop exceeds a specified limit, the filter may self-destruct or, in the alternative, the pressure at the jet orifices may be reduced resulting in loss of flow through the orifices which in turn has a deleterious effect in the form of a loss of strength of the non-woven product being formed.

One way to insure that the filters do not fail is to change them on a time basis. However, it has been found that when filters are changed on a time basis, most of the filters had not reached their full life cycle resulting in an ineffective costly operation.

Another way to monitor the condition of the filter is to install a differential pressure transmitter across the filter to signal an alarm when the filter pressure builds up due to blockage beyond a specified limit. This requires the costly installation of transmitters and electronic equipment.

SUMMARY OF THE INVENTION

Filter differential pressure can be determined without the need for individual differential pressure transmitters on each jet by installing one pressure transmitter on the header supplying a plurality of jets and determining when the filter differential pressure exceeds a set amount by correlating the set amount with the control valve opening.

BRIEF DESCRIPTION OF THE DRAWINGS

FIGS. 2A and 2B are logic flow diagrams of the computer program used to implement this invention.

DETAILED DESCRIPTION OF THE ILLUSTRATED EMBODIMENT

Figure 1:
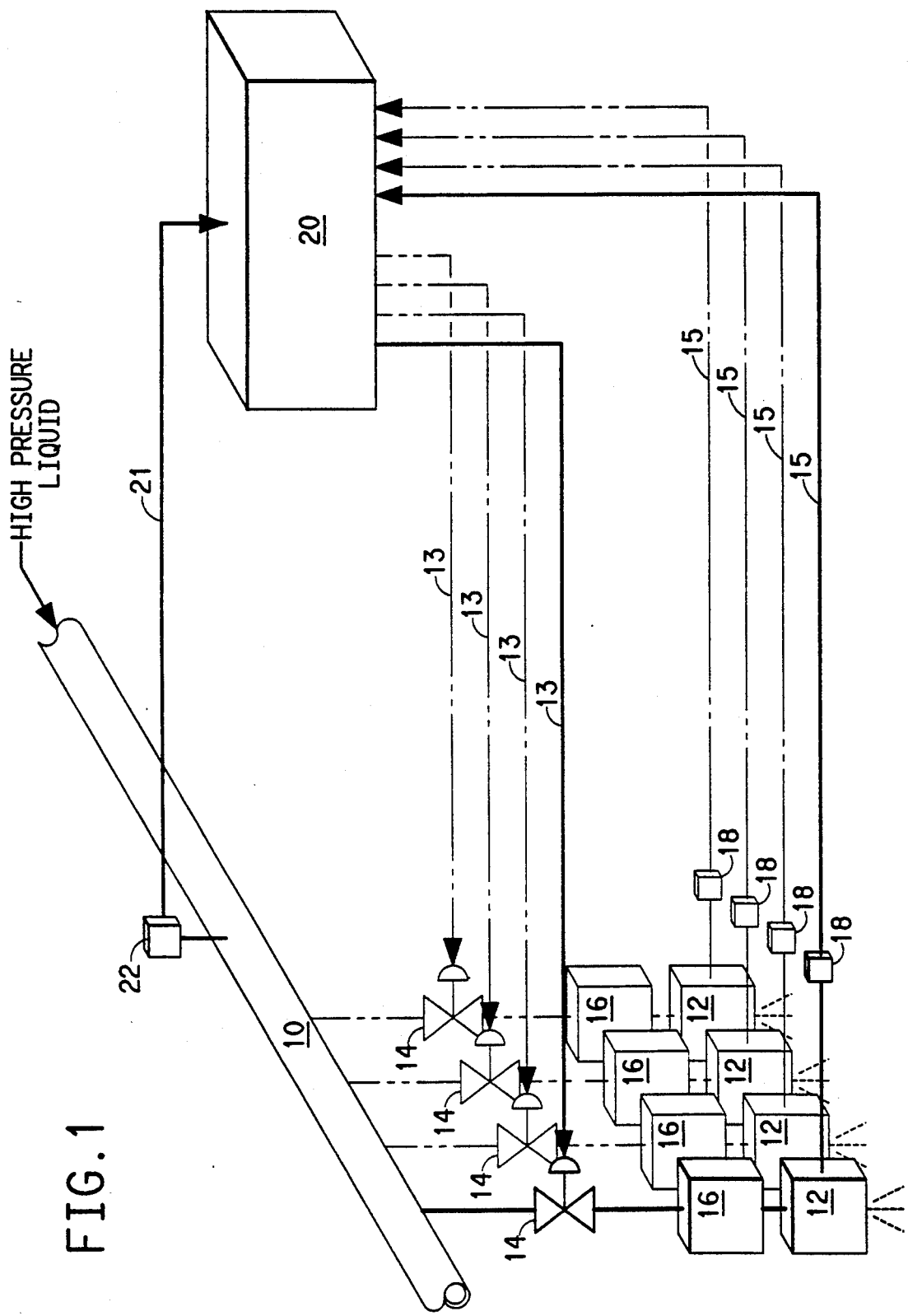
FIG. 1 is a schematic view of apparatus producing liquid jet streams.

FIG. 1 schematically illustrates apparatus useful for treating fibrous webs with water as disclosed in U.S. Pat. No. 3,485,706 which is incorporated herein by reference.

The apparatus chosen for purposes of illustration includes a manifold 10 supplied by high pressure liquid from a source (not shown). Attached to the manifold is at least one jet 12 supplied with pressurized liquid through a control valve 14 and a filter 16 to protect the jet from foreign particles in the liquid. Identical jets and associated apparatus are identified by the same element numbers. A pressure transmitter 18 is connected to jet 12 and feeds signals to computer 20 via data line 15. A pressure transmitter 22 is connected to manifold 10 and feeds signals to computer 20 via data line 21. Output signals from computer 20 are fed to control valves 14 via data lines 13.

The major elements of the apparatus are listed below with a more detailed description of each.

| Element No. | Description | Model No. | Manufacturer |
| --- | --- | --- | --- |
| 14 | Control valve | hp3600gt | Fischer |
| 18 | Pressure transmitter | ST-3000 | Honeywell |
| 20 | Computer | Vax | Digital Equipment |
| 22 | Pressure transmitter | ST-3000 | Honeywell |

In operation, high pressure liquid is supplied to manifold 10 as shown in FIG. 1. Each jet 12 is connected to manifold 10 through a separate pipe line that includes a control valve 14 and a filter 16 to protect the jet from foreign particles that may be in the liquid. The inputs to computer 20 are the jet pressure over data line 15 and the manifold pressure over data line 21.

Since a plurality of jets are fed from the same manifold, the method of this invention is unique in that it requires only one additional pressure transmitter 22 rather than a plurality of pressure transmitters, one at each filter, because instead of measuring pressure drop across the filter in this manner, the method of this invention reliably calculates the pressure drop across the filter based on data from the manifold, the jet and the control valve as described below.

The total pressure drop (measured in pounds per square inch) between manifold 10 and the output of jet 12 is equal to the sum of the pressure drops across the jet 12, the filter 14 and the control valve 16. Since the filter pressure drop is of interest to determine when to change the filter, all that is needed is the data values of pressure of the manifold, control valve and jet.

The manifold pressure is measured by pressure transmitter 22. The jet 12 pressure is maintained at a constant predetermined set point by the computer 20 signaling the control valve 16 which moves to regulate flow through it in response to signals from the computer to maintain the jet pressure at a constant despite a buildup in pressure in the filter from particulate material in the liquid collected in the filter. The control valve pressure drop is determined as follows:

The manufacturer of the control valve provides a characteristic plot of the valve which relates the control signal from the computer to the control valve (i.e., % openness of the valve) and its resulting flow factor (CV). When the valve is fully closed, its CV equals zero. As the valve opens, its CV increases and, therefore, the flow through the valve increases.

By examining the relationships discussed above in the context of process, standard-operating conditions, and using a desired maximum value of pressure across the filter 14 that will dictate removal of the filter, a value of computer output correlated to percent control valve opening is downloaded as an alarm limit in the computer. Whenever the computer output to the control valve exceeds this limit, an alarm message is activated to inform an operator that the control valve is open too much. This can indicate several possible situations:

1. that the filter is plugged or
2. that the wrong or no jet is installed in the system and the valve had to be opened too much to try to establish the jet pressure set point.

Figure 2B:
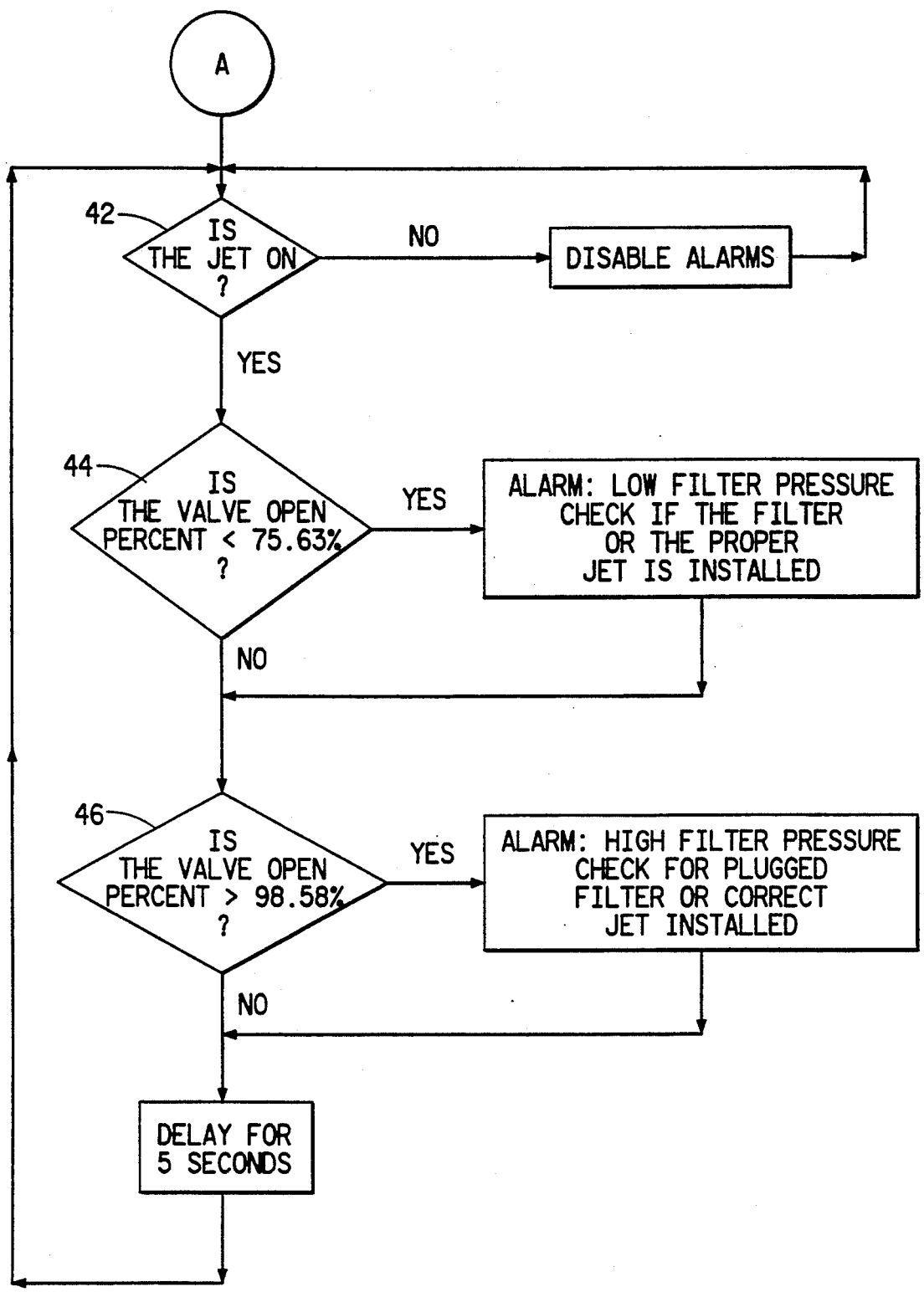

FIGS. 2A and 2B serve to illustrate the method used to determine when a filter is to be changed. In FIG. 2A the jet set point pressure, the manifold pressure and the jet flow rate for a specified set point are obtained and supplied to the computer in steps 30, 32 and 34. In the clean filter situation, the threshold pressure drop across the filter of zero psi is entered in the computer in step 36 and in the plugged filter situation a threshold pressure drop of 400 psi is entered in the computer in step 35. Using the following equation the percent valve opening is determined for control valve 16 in steps 37, 38, 39 and 40:

$$\% \text{ valve open} = K_1 \ln\left[\frac{\text{flow through jet in GPM}}{\sqrt{\text{manifold psi} - (\text{filter psi} + \text{jet psi})}}\right] + K_2$$

The percent control valve openness then is used to indicate a plugged filter or whether the correct jet is installed.

In the model hp3600gt control valve 14 used for illustration, the value of $K_1$ is 28.52 and the value of $K_2$ is 26.55.

What is claimed is:

1. A method for determining a pressure drop across a filter located between a jet and a pressure control valve that is connected to a pressurized liquid manifold with the aid of a computer to calculate percent openness of the valve and determine when to replace the filter, said method comprising:
   a) obtaining a data set of manifold pressure, jet pressure set point, and the correlation between percent open and a corresponding flow factor of the pressure control valve;
   b) providing the computer with a data base that includes the data set obtained in step (a);
   c) programming the computer to calculate percentage openness of the control valve according to the following relationship:

$$\% \text{ valve openness} = K_1 \ln\left[\frac{\text{flow through jet in GPM}}{\sqrt{\text{manifold psi} - (\text{filter psi} + \text{jet psi})}}\right] + K_2$$

wherein $K_1$ and $K_2$ are constants based on valve manufacturer provided characteristic plot of openness of the valve and resulting flow factor, GPM=gallons per minute, manifold psi=manifold pressure, filter psi=pressure drop across the filter and jet psi jet set point pressure signaling when said % valve the openness exceeds a predetermined value; and replacing said filter in response to said signaling.

2. The method of claim 1 wherein $K_1$ is 28.52 and $K_2$ is 26.55.

* * * * *